United States Patent [19]

Hügel et al.

[11] Patent Number: 4,620,406
[45] Date of Patent: Nov. 4, 1986

[54] SCREEN SLEEVE FOR USE WITH A HARDENABLE MASS FOR SECURING AN ANCHORING ELEMENT

[75] Inventors: Robert Hügel, Kaufering, Fed. Rep. of Germany; Sven Kolb, Bregenz, Austria; Erich Leibhard, Munich, Fed. Rep. of Germany

[73] Assignee: Hilti Aktiengesellschaft, Liechtenstein

[21] Appl. No.: 755,423

[22] Filed: Jul. 16, 1985

[30] Foreign Application Priority Data

Jul. 16, 1984 [DE] Fed. Rep. of Germany ....... 3426174

[51] Int. Cl.$^4$ .............................................. E04B 1/38
[52] U.S. Cl. ...................................... 52/704; 405/261
[58] Field of Search ........................ 52/698, 704, 170; 405/260, 261

[56] References Cited

U.S. PATENT DOCUMENTS

| | | | |
|---|---|---|---|
| 2,849,866 | 9/1958 | Flygare et al. | 52/698 X |
| 3,703,790 | 11/1972 | Mattes et al. | 52/704 X |
| 3,877,235 | 4/1975 | Hill | 52/698 X |
| 3,901,039 | 8/1975 | Lundkvist | 405/260 |
| 4,224,971 | 9/1980 | Müller et al. | 405/261 X |
| 4,430,025 | 2/1984 | Ciavatta | 405/261 |
| 4,490,074 | 12/1984 | Chaiko | 405/261 X |
| 4,528,792 | 7/1985 | Cross et al. | 52/704 |

Primary Examiner—Carl D. Friedman
Attorney, Agent, or Firm—Toren, McGeady, Stanger, Goldberg & Kiel

[57] ABSTRACT

A screen sleeve for use in combination with a hardenable mass for securing an anchoring element, inserted into the sleeve, in a receiving material where the sleeve is formed of an axially elongated, woven wire mesh, cylindrically shaped tubular member closed at one end and open at the other. The tubular member has a flange at its open end. Adjacent the flange, one or more outwardly projecting protrusions are formed from the wire mesh defining the tubular member.

8 Claims, 7 Drawing Figures

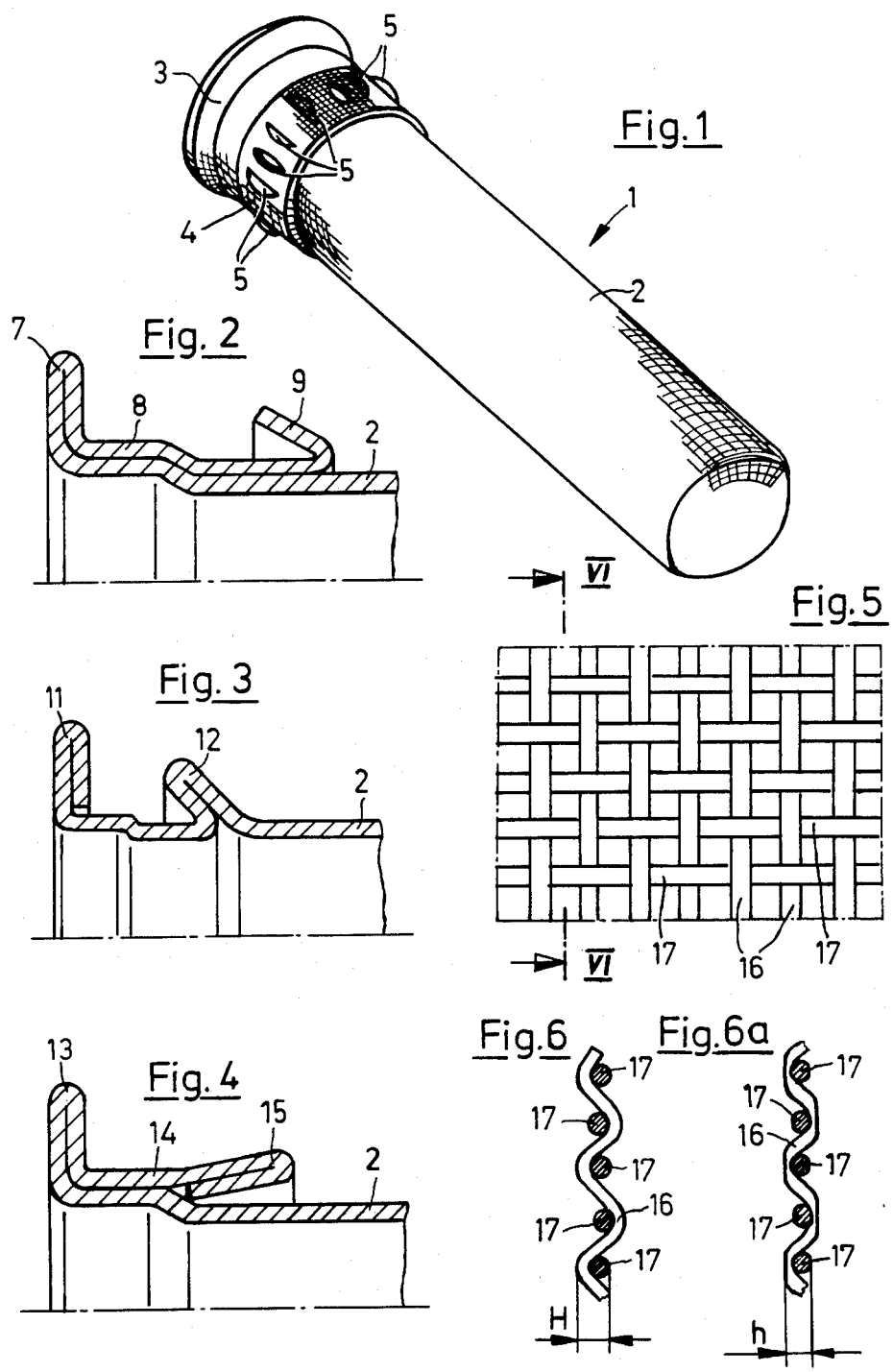

SCREEN SLEEVE FOR USE WITH A HARDENABLE MASS FOR SECURING AN ANCHORING ELEMENT

BACKGROUND OF THE INVENTION

The present invention is directed to a screen sleeve used in combination with a hardenable mass for securing anchoring elements in a receiving material where the sleeve is formed of a wire mesh in the shape of an axially elongated tubular member closed at its leading end and with an outwardly projecting flange extending radially outwardly from the open trailing end of the tubular member.

For fixing anchoring elements in a base material including hollow chambers, such as masonry, screen sleeves are inserted into previously formed openings in the base material and a hardenable mass is introduced into the sleeves under pressure. Such screen sleeves are intended to limit the quantity of the hardenable mass introduced and also to create a holding effect in the hollow chambers in the base material by means of the mass passing through the openings in the sleeve. After the mass is introduced into the sleeve positioned within an opening in the base material, an anchoring element is inserted into the screen sleeve and the anchoring element may be a threaded rod or a threaded anchor sleeve. The anchoring element is fixed by the hardenable mass in the base material with the interposition of the screen sleeve.

A known screen sleeve constructed of wire mesh includes a tubular member closed at its leading end and open at its trailing end. A flange is formed at the trailing end of the tubular member and projects radially outwardly from the member. The flange serves as a stop to limit the insertion of the screen sleeve into the opening formed in the base material. After the introduction of the hardenable mass, a pressure head, acting opposite to the direction of insertion of a fastening element into the sleeve, acts on the sleeve. As a result, after the removal of the device for injecting the hardenable mass into the screen sleeve, the sleeve is partially pressed out of the opening and prior to setting of the mass during which a positive engagement in the base material takes place. If the screen sleeve is to be installed vertically upwardly, it must be prevented from falling out of the opening due to the force of gravity and this requires cumbersome manipulation. Such disadvantages are overcome in another known screen sleeve composed of a hollow tubular member closed at its leading end and constructed of wire mesh with a plastics material flange attached to the trailing end of the tubular member. To assure a self-acting engagement of the screen sleeve in the opening during installation, a ring-shaped section with a smaller diameter and a conically shaped outer contour tapering in the insertion direction is provided with the flange and overlaps the tubular member in the insertion direction for about 10% of its length. During the insertion of the screen sleeve into the opening in the base material, the ring-shaped section wedges itself into the opening due to its conically shaped outer contour by widening outwardly against the surface at the inlet into the opening. This wedging action prevents the screen sleeve from being pushed or pressed out of the hardenable mass before it sets, while it is still under a pressure held, or from falling out of an upwardly directed opening prior to being fixed by the hardenable mass.

A considerable disadvantage of this known screen sleeve is its considerable production cost. Initially, the tubular member formed of wire mesh has to be fabricated and, subsequently, the separately formed flange of plastics material has to be rigidly secured to the tubular member.

SUMMARY OF THE INVENTION

Therefore, the primary object of the present invention is to provide a screen sleeve which by overcoming the pressure head and its own weight, is adequately fixed in the base material and, in addition, is distinguished by its low cost.

In accordance with the present invention, the screen sleeve is formed by a tubular member with a flange at its trailing end and with at least one outward protrusion of the wire mesh forming the sleeve, projecting outwardly from the outer surface of the tubular member.

The screen sleeve is formed of the tubular member, the flange at its trailing end, and the outward protrusion adjacent the flange, all of which are formed of the same wire mesh. Using the same material forming the entire screen sleeve permits a considerable reduction in production costs. The protrusions from the tubular member assure a dependable fixation of the screen sleeve in the opening in the base material in which the sleeve is anchored. The cost of producing the screen sleeve can be lowered further if the protrusion or protrusions are formed as a single unit with the tubular member. Accordingly, the screen sleeve can be produced in a simple manner from a single blank of woven wire mesh in a bending operation, without any additional time-consuming assembly or other steps being required.

For the sake of simplicity, the outwardly protruding portion on the screen sleeve can be provided by one or more outwardly projecting members located on the tubular member adjacent the flange. The protrusion can, for instance, be an outwardly extending or circumferentially extending projection of the tubular member. Preferably, the protrusion can be formed by folding the wire mesh. The folding step can be effected by bending an end portion of the wire mesh inwardly or outwardly relative to the tubular member. In addition, it is also possible to form the outward protrusion by folding a part of the tubular member adjacent to the flange.

In one embodiment, the outward protrusion or fold slopes outwardly from the tubular member in the direction toward the leading end of the sleeve.

In another embodiment of the invention, the protrusions are formed by axially extending ribs. The ribs can be formed in an edge zone of the blank from which the sleeve is formed with the ribs located between the flange and the end of the blank. In a particularly simple arrangement of the invention, the ribs are formed by outwardly bent wall portions of the wire mesh forming the sleeve. The ribs extend tangentially from the outer surface of the sleeve adjacent the flange. Such ribs have the appearance of ears. The ribs are arranged uniformly around the outer periphery of the sleeve. To prevent the sleeve from being rotated in either direction, the adjacent outwardly bent protrusions extend tangentially in opposite directions.

Another advantageous feature of the invention involves, prior to the step of forming the wire mesh into the axially extending tubular member, the wire mesh being subjected to a rolling operation in which the intersection points of the woven wire mesh are pressed so that the thickness at the intersection points is reduced to 60 to 90% of the original thickness prior to rolling. This rolling procedure causes the intersecting wires of the wire mesh to be positively locked relative to one another at the points of intersection so that, adjacent the edge of the blank, separation of the wires is prevented and, in addition, no spring forces act counter to the bending operation when the tubular member is formed. Furthermore, in the rolling operation there is an increase in the surface of the wire mesh in the range of 20 to 40% which affords a corresponding economy of material. The junction of the abutting locations of the blank after the bending operation can, due to the fixing of the individual wires forming the mesh during the rolling operation, occur through a slight overlapping and subsequent upsetting. As a result, separate connecting materials such as solder or the like are unnecessary.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a perspective view of a screen sleeve embodying the present invention;

FIG. 2 is an enlarged partial sectional view through the flange area of the screen sleeve illustrating another embodiment as compared to FIG. 1;

FIG. 3 is an enlarged partial sectional view of the flange region of still another embodiment of the present invention as exhibited in FIG. 1;

FIG. 4 is a third enlarged sectional view of the flange region of another embodiment of the screen sleeve displayed in FIG. 1;

FIG. 5 is an enlarged plan view of a section of wire mesh used in forming the screen sleeve;

FIG. 6 is a sectional view taken along the line VI—VI in FIG. 5 of the wire mesh prior to a rolling operation; and FIG. 6a is a sectional view similar to that shown in FIG. 6, however, illustrating the wire mesh after the rolling operation has been completed.

DETAILED DESCRIPTION OF THE INVENTION

In FIG. 1 a screen sleeve 1 is illustrated formed from a single piece or blank of wire mesh. The screen sleeve 1 includes a hollow cylindrically shaped tubular member 2 closed at its leading end, that is, the first end inserted into an opening in which the screen sleeve is to be secured, and open at its trailing end. A flange 3 encircles the trailing end of the tubular member 2 and extends radially outwardly from the outer surface of the tubular member. Extending from the flange for approximately 10% of the axial length of the tubular member 2 toward the leading end is an outer layer 4 of wire mesh encircling the outer surface of the tubular member. In the outer layer 4 ribs 5 are distributed around the circumference of the layer and are bent outwardly from the outer surface of the layer 4. Ribs 5 extend tangentially away from the outer surface of the tubular member 2 or the outer layer 4 and adjacent ribs extend toward one another, that is, the ribs alternate in the direction in which they extend around the outer surface of the layer 4.

In FIG. 2 a small axial portion of the tubular member 2 is shown adjacent to a flange 7 providing a different arrangement as compared to FIG. 1. As can be seen in FIG. 2, the wire mesh forming the tubular member 2 is first bent outwardly at the trailing end to form the flange 7 and then has an axially extending section extending toward the leading end for a short portion of the axial length of the tubular member and then, adjacent the end of the blank forming the sleeve 1, a circumferentially extending protrusion 9 is formed. The protrusion 9 slopes outwardly from the axially extending outer layer 8 in the direction toward the trailing end.

In FIG. 3 the tubular member 2 is provided with a radially outwardly extending flange 11 at the trailing end. The end of the blank forming the tubular member 2 at the trailing end of the sleeve 1 defines the radially inner end of the bent over flange 11. Adjacent the flange 11 in the direction toward the leading end of the tubular member 2, an axially extending section of the tubular member is drawn outwardly and folded upon itself to provide a protrusion 12. The protrusion 12, as the protrusion 9 in FIG. 2, slopes outwardly away from the outer surface of the tubular member in the direction toward the flange 11.

In FIG. 4, the blank forming the tubular member 2 is folded over at the end portion forming the trailing end in a manner similar to that in FIG. 2. As a result, an outwardly extending flange is folded from the wire mesh in the region spaced from the end of the blank. An outer layer 14 then extends from the flange toward the leading end for a short axial portion of the tubular member and then is folded over providing an outer layer portion forming a continuation of the outer layer 14 an an inner layer portion defining the end of the blank. Approximately half of the outer layer 14 forms a projection 15 sloping outwardly away from the outer surface of the tubular member 2. As distinguished from FIGS. 2 and 3, the outward protrusion 15 slopes outwardly in the direction toward the leading end of the tubular member.

In FIG. 5 a section of the wire mesh forming the screen sleeve 1 is illustrated made up of the woven wires 16 and 17. In FIG. 6 the interwoven arrangement of the wires 16 and 17 can be noted with the wires crossing one another at intersections. After the wire mesh is woven the intersection points have a thickness dimension H corresponding to twice the diameter of the wires forming the mesh. To afford an advantageous arrangement of the wire mesh and to economize on the amount of material used, the wire mesh is subjected to a rolling operation prior to forming the blanks for the screen sleeves. As a result, the wires 16, 17 at the intersection points are flattened on the outside surfces of the wire mesh, note FIG. 6a, so that the thickness of the wire mesh at the intersection points is reduced to the range of about 80% of the original thickness. The rolled wire mesh can be bent to form the tubular sleeve without any counteracting forces being developed opposing the bending operation.

While specific embodiments of the invention have been shown and described in detail to illustrate the application of the inventive principles, it will be understood that the invention may be embodied otherwise without departing from such principles.

We claim:

1. Screen sleeve for use in combination with a hardenable mass for securing an anchoring element in an opening or bore formed in a receiving material, comprising an axially elongated wire mesh cylindrically shaped tubular member having a leading end inserted first into the receiving material and a trailing end and forming a bore therein extending between the leading end and the trailing end, said tubular member being open at the trailing end and closed at the leading end, a flange formed at the trailing end of said tubular member extends transversely of the axis of and radially outwardly from said tubular member, said tubular member adjacent the trailing end thereof has at least one outwardly extending protrusion formed of the wire mesh forming said tubular member.

2. Screen sleeve, as set forth in claim 1, wherein said at least one protrusion is formed from a single unit of the wire mesh forming said tubular member.

3. Screen sleeve, as set forth in claim 1 or 2, wherein said at least one protrusion is formed by a folded section of said wire mesh extending from said flange for a portion of the axial length of said tubular member toward the leading end thereof with said protrusion projecting outwardly from the outer surface of said tubular member located between said protrusion and the leading end of said tubular member.

4. Screen sleeve, as set forth in claim 1 or 2, wherein said at least one protrusion comprises a plurality of axially extending ribs spaced apart around the circumference of said tubular member adjacent said flange.

5. Screen sleeve, as set forth in claim 4, wherein said ribs are bent outwardly from and extend generally tangentially to the outer surface of said tubular member extending from said flange.

6. Screen sleeve, as set forth in claim 3, wherein said protrusions slope outwardly from the outer surface of said tubular member in the direction toward the trailing end of said tubular member.

7. Screen sleeve, as set forth in claim 3, wherein said protrusions slope outwardly in the direction toward the leading end of said tubular member.

8. Screen sleeve, as set forth in claim 1 or 2, wherein said wire mesh is woven of intersecting wires and said woven wire mesh is rolled for flattening said intersecting wires at the intersecting junctures thereof.

* * * * *